UNITED STATES PATENT OFFICE 2,479,944

METALLIZED BENZIMIDAZOLE AZO DYESTUFFS

Charles E. Lewis, Somerville, N. J., assignor to American Cyanamid Company, New York, N. Y., a corporation of Maine No Drawing. Application October 12, 1945, Serial No. 622,095

9 Claims. (Cl. 260—146)

This invention relates to metallized azo dyestuffs. More particularly, it relates to metal complexes of azo dyestuffs with metals of atomic weight from 52–64, represented by the following formula:

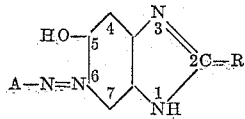

in which R is hydrogen, mononuclear aryl or lower alkyl and A is the residue of a diazotized amine which contains a lake-forming group ortho to the azo group.

Metallized azo dyes have been used extensively in the dyeing of basic nitrogeneous fibers. For this use high tinctorial power and resistance to fading under exposure to ultra violet light are important requirements. Many metallized azo dyes which are satisfactory in one respect are unsatisfactory in the other, and vice-versa.

The metallized dyestuffs of the present invention have the advantage that the majority produce intense and bright shades and show superior resistance to fading. They may be used in conventional dyeing procedures and it is an advantage that no new or complicated dyeing techniques are required.

The azo dyes which are to be metallized are themselves new chemical compounds and are not claimed in this case as such since they form the subject matter of my copending application Ser. No. 618,796, filed Sept. 26, 1945. They may be prepared in general by coupling the corresponding 5-hydroxy-benzimidazoles with diazotized aromatic amines containing a lake-forming group ortho to the diazo group, preferably the coupling takes place in the presence of an acid binding agent.

Typical hydroxy benzimidazoles which can be used as coupling components including: 2-methyl-5-hydroxy benzimidazole, 2-ethyl-5-hydroxy benzimidazole, 5-hydroxy benzimidazole, 2-phenyl-5-hydroxy benzimidazole, 2-(4'-sulfophenyl)-5-hydroxy benzimidazole, 2-p-tolyl-5-hydroxy benzimidazole, 2-(4'-aminophenyl)-5-hydroxy benzimidazole. These 5-hydroxy benzimidazoles are readily obtained through reduction of a 3-nitro-4-acylamino phenyl ester of an organic carboxylic acid and cyclization according to the procedure described by S. D. Gershon and G. L. Webster (J. American Chemical Society, vol. 63, page 2853, 1941).

The diazo components useful in preparing the products of the present invention are those that contain in the ortho position to the diazo group a lake-forming group which can be converted into a heavy metal complex. The lake-forming groups are particularly the hydroxyl group and the carboxylic acid group also the alkoxy group and halogen which under specific conditions in the process of metallization may be replaced by the complex-forming hydroxyl. Some typical examples of useful amines for the production of these diazo components are 2-amino-4-nitro phenol, 2-amino-5-nitro phenol, 3-amino-4-hydroxy benzene sulfonic acid, 2-methyl-4-amino-5-hydroxy benzene sulfonic acid, 2-nitro-4-amino-5-hydroxy benzene sulfonic acid, 2-chloro-4-amino-5-hydroxy benzene sulfonic acid, 2-hydroxy-3-amino-5-chloro benzene sulfonic acid, 3-amino-4-hydroxy-5-nitro benzene sulfonic acid, 2-hydroxy-3-amino-5-nitro benzene sulfonic acid, 2-hydroxy-3-amino-5-sulfobenzoic acid, 2-amino-5-sulfobenzoic acid, anthranilic acid, 1-(4'-sulfophenyl)-3-methyl-4-amino-5-pyrazolone, 1-amino-2-hydroxy naphthalene-4-sulfonic acid, 1-amino-2-hydroxy-6-nitro naphthalene-4-sulfonic acid, 3,3'-dichloro benzidine, orthodianisidine and the like.

The diazo components may be also further substituted by azo groups and benzimidazoles may be used also as end components in polyazo dyes.

Any of the metals of atomic weight from 52–64 may be employed to produce the products of the present invention. For the dyeing of wool, the chromium complexes are of greater value.

It is an advantage of the present invention that introduction of the metal into the azo dyestuffs may be effected in the customary manner, for example, by refluxing an aqueous solution of the azo dye with salts or other suitable compounds of the metal or by heating under pressure. Particular examples of such agents are: chromium hydroxide, chromic acetate, chromic formate, chromic fluoride, chromic chloride, basic chromic chloride, chromic sulfate, basic chromic sulfate, chromic benzene sulfonate, chromic naphthalene disulfonate, chromic chromate and useful salts of the other metals mentioned above such as, for example, copper sulfate, cobalt chloride, nickel sulfate and the like. The metallizing agents may be used in the presence or absence of agents designed to control the pH such as acids, bases and buffers. They may also be used in the presence of ammonia or amines. Also two different metals may be used simultaneously in the metallization to produce valuable mixtures of metal complexes.

The invention is illustrated by the following examples, the parts being parts by weight. It is theoretically possible for the diazotized amines to couple in the 4 or 6 position, that is to say, ortho to the hydroxy group on the benzimidazole ring. Accordingly in the formula in the examples the azo group is not shown as coupled to a definite carbon atom of the ring but it should be understood that the coupling must be ortho to the hydroxy group.

Example 1

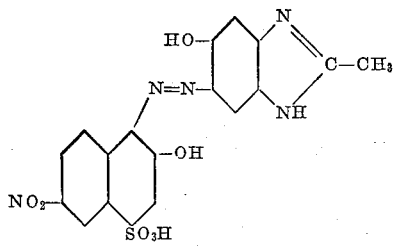

A solution of 2.96 parts of 2-methyl-5-hydroxy benzimidazole in 60 parts of water containing 0.24 part sodium hydroxide is iced internally to 5° C. and 6.8 parts of 1-diazo-2-hydroxy-6-nitro naphthalene-4-sulfonic acid (87% purity) is added. The reaction mixture is stirred until coupling is complete as is indicated by a negative diazo test on spotting against alkaline H-acid solution. The reaction mixture is diluted with 50 parts of water and hydrochloric acid is added until the solution is acid when spotted on Congo red test paper. The precipitated dyestuff is separated by filtration, and is dried at 55° C.

Example 2

A mixture of 2.96 parts of the azo dyestuff obtained as described in Example 1, 125 parts of water, and 22 parts of basic chromic acetate solution containing 0.015 mol. of chromium is stirred and heated at reflux temperature during one hour. 5 parts of a 5% sulfuric acid solution are added and refluxing is continued for 18 hours. After cooling the reaction mixture, the chromium complex of the dyestuff is separated by filtration.

Example 3

0.25 part of the complex chromium compound obtained as described in Example 2 is dissolved in 300 parts of water and 2 parts of 20% sulfuric acid solution are added. 5 parts of a wetted-out wool skein are entered into the dye bath and while agitating the wool, the temperature is raised to and maintained at the boil to full color development. The skein is rinsed in fresh water and is dried. It is levelly dyed a high gray of excellent fastness to light and washing.

Example 4

A mixture of 2 parts of the azo dyestuff obtained as described in Example 1, 25 parts of water and 25 parts of 20% sodium acetate solution is heated to 70° C. 10 parts of a solution containing 1.4 parts of copper sulfate pentahydrate is added and the mixture is refluxed about 4 hours with stirring. The copper complex of the dyestuff is isolated by cooling and filtering.

This product dyes wool an attractive violet shade from a bath weakly acid with acetic acid.

Example 5

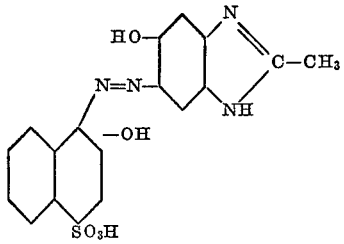

A solution of 2.96 parts of 2-methyl-5-hydroxy benzimidazole in 60 parts of water containing 0.24 part of sodium hydroxide is cooled by addition of ice to 5° C. and 5.4 parts of the diazo compound (92.6% purity) derived from 1-amino-2-hydroxy naphthalene-4-sulfonic acid in the usual manner and 1 part of pyridine are added. The reaction mixture is stirred until coupling is complete as is indicated by a negative diazo test on spotting against H-acid solution and then 25 parts of water are added. The azo dyestuff is precipitated by acidification with hydrochloric acid and is isolated by filtration.

Example 6

2.9 parts of the azo dyestuff obtained as described in Example 5, 22.7 parts of basic chromic acetate solution containing 0.015 mol. of chromium are refluxed for two hours. To the reaction mixture, 5 parts of 5% sulfuric acid are added and the reaction mixture is heated at reflux temperature for an additional 20 hours. The chromium complex of the dyestuff is precipitated by addition of salt, the reaction mixture is cooled and the product is separated by filtration.

This product dyes wool according to the procedure described above in Example 3, an attractive gray shade.

Example 7

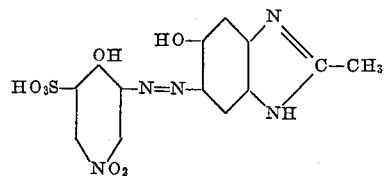

5 parts of 2-amino-4-nitrophenol-6-sulfonic acid (93.7% purity) in 60 parts of water containing 10 parts of hydrochloric acid (17%) are diazotized by the addition of 20 parts of a 7% sodium nitrite solution. The diazo solution so obtained is added to a stirred solution containing 2.96 parts of 2-methyl-5-hydroxy benzimidazole, 5 parts of 20% sodium hydroxide solution, and 20 parts of 10% sodium carbonate solution in 100 parts of water. The temperature is maintained at 5° C. during the addition and while stirring to completion of the coupling. The dyestuff is precipitated by acidifying the solution with hydrochloric acid to an acidic test to Congo Red paper followed by addition of salt and is separated by filtration.

Example 8

To 45.4 parts of basic chromic acetate solution containing 0.03 mol. of chromium, 5.8 parts of the azo dyestuff obtained as described in Example 7 are added and the solution is refluxed for two hours. At this time, 10 parts of 5% sulfuric acid solution are added and the reaction mixture is stirred at reflux temperature to completion of metallization. The chromium complex is isolated by filtration after cooling and salting.

It dyes wool according to the procedure described in Example 3 a light Bordeaux shade of good fastness to light and washing.

Example 9

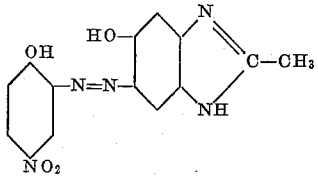

1.83 parts of 2-amino-4-nitrophenol (84% purity) in 20 parts of water are treated with 3.8 parts of hydrochloric acid (17%) and then with 10 parts of a 7% solution of sodium nitrite. The resulting diazo solution is added at low temperature to an agitated solution containing 1.48 parts of 2-methyl-5-hydroxy benzimidazole, 25 parts of 20% solution of sodium hydroxide and 10 parts of a 10% solution of sodium carbonate in 50 parts of water. When coupling is complete, the dyestuff is separated by filtration.

Example 10

2.0 parts of the dyestuff prepared as described in Example 9 in 75 parts of water are heated to the boil, made alkaline by addition of caustic soda and then acidified with glacial acetic acid to an acid test on red litmus. The reaction mixture is treated with 50 parts of a solution containing 10 parts of sodium acetate and 10 parts of a solution containing 2 parts of cobaltic chloride hexahydrate and is boiled for three hours. The temperature is lowered to 25° C. and the precipitated product is filtered off and dried.

This dyestuff gives a bright russet shade when dyed on silk from a bath weakly acid with acetic acid.

The term "lake-forming group" is used in the specification and claims in its ordinary meaning in the chemistry of metallizable azo dyes, namely, a group which is capable of forming a complex with metals having an atomic weight from 53–64, such groups being normally hydroxyl, alkoxy, chlorine and carboxylic acid groups.

The term "lower alkyl" is used in its ordinary sense as covering alkyl groups having from 1–5 carbon atoms.

I claim:

1. A dyestuff being a complex of a metal of atomic weight from 52 to 64, with an azo dye prepared by coupling a diazotized aromatic amine of benzene and naphthalene series, having a lake-forming group ortho to the diazo group, with a compound of the formula

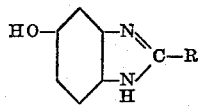

in which R is a member of the group consisting of hydrogen, mononuclear aryl, and lower alkyl.

2. A dyestuff being a complex of a metal of atomic weight from 52 to 64 with an azo dye prepared by coupling a diazotized aromatic amine of the benzene and naphthalene series, having a lake-forming group ortho to the diazo group, with a compound of the formula:

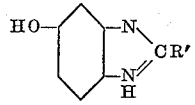

in which R' is a lower alkyl.

3. A dyestuff being a complex of a metal of atomic weight from 52 to 64 with an azo dye prepared by coupling a diazotized aromatic amine of the benzene and naphthalene series, having a lake-forming group ortho to the diazo group, with a compound of the formula:

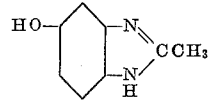

4. A dyestuff according to claim 1 in which the metal is chromium.

5. A dyestuff according to claim 2 in which the metal is chromium.

6. A dyestuff according to claim 3 in which the metal is chromium.

7. A dyestuff according to claim 3 in which the metal is chromium and the diazotized aromatic amine is 1-amino-4-nitrophenol-6-sulfonic acid.

8. A dyestuff according to claim 3 in which the metal is chromium and the diazotized aromatic amine is 1-amino-2-naphthol-4-sulfonic acid.

9. A dyestuff according to claim 3 in which the metal is chromium and the diazotized aromatic amine is 1-amino-6-nitro-2-naphthol-4-sulfonic acid.

CHARLES E. LEWIS.

REFERENCES CITED

The following references are of record in the file of this patent:

UNITED STATES PATENTS

| Number | Name | Date |
| --- | --- | --- |
| 1,241,153 | Schule | Sept. 25, 1917 |
| 1,292,385 | Anderwert | Jan. 21, 1919 |
| 1,972,988 | Giemsa et al. | Sept. 11, 1934 |
| 2,109,552 | Schindhelm et al. | Mar. 1, 1938 |
| 2,203,196 | Hanhart | June 4, 1940 |
| 2,270,451 | Keller | Jan. 20, 1942 |
| 2,282,323 | Dickey et al. | May 12, 1942 |
| 2,308,023 | Peterson | Jan. 12, 1943 |

FOREIGN PATENTS

| Number | Country | Date |
| --- | --- | --- |
| 353,273 | France | June 24, 1905 |
| 181,783 | Germany | Mar. 1, 1907 |
| 458,843 | Great Britain | Dec. 28, 1936 |
| 491,551 | Great Britain | Sept. 5, 1938 |